(12) United States Patent
Leitner (10) Patent No.: US 11,131,844 B2
(45) Date of Patent: Sep. 28, 2021

(54) PIVOT HINGE FOR A LONG-RANGE OPTICAL INSTRUMENT

(71) Applicant: Swarovski-Optik KG., Absam (AT)

(72) Inventor: Matthias Leitner, Gnadenwald (AT)

(73) Assignee: Swarovski-Optik KG.

( * ) Notice: Subject to any disclaimer, the term of this patent is extended or adjusted under 35 U.S.C. 154(b) by 315 days.

(21) Appl. No.: 16/138,015

(22) Filed: Sep. 21, 2018

(65) Prior Publication Data

US 2019/0094513 A1    Mar. 28, 2019

(30) Foreign Application Priority Data

Sep. 22, 2017    (AT) ............................... A 50807/2017

(51) Int. Cl.
*G02B 23/00*    (2006.01)
*G02B 23/18*    (2006.01)
(Continued)

(52) U.S. Cl.
CPC .............. *G02B 23/18* (2013.01); *F16M 11/10* (2013.01); *G02B 7/023* (2013.01); *G02B 7/06* (2013.01);
(Continued)

(58) Field of Classification Search
CPC . G02B 7/00; G02B 7/023; G02B 7/12; G02B 7/24; G02B 23/00; G02B 23/16; G02B 23/18
(Continued)

(56) References Cited

U.S. PATENT DOCUMENTS 3,431,043 A * 3/1969 Cassidy .................. G02B 7/12
359/413
4,087,153 A    5/1978 Hengst
(Continued)

FOREIGN PATENT DOCUMENTS

CA    1017980 A    9/1977
DE    2358697 A1    6/1975
(Continued)

OTHER PUBLICATIONS

European Search Report for EP18196032 dated Jan. 18, 2019; 2 pages.

*Primary Examiner* — Thong Q Nguyen
(74) *Attorney, Agent, or Firm* — Lerner, David, Littenberg, Krumholz & Mentlik, LLP (57) ABSTRACT

The invention relates to a Pivot hinge (1) for a Long-range optical Instrument (10), in particular binocular, comprising:
at least two Joint Elements (2, 3) pivotable against each other about a Pivot Axis (4), and
an Adjustment Device (5) for adjusting the pivot resistance and/or a Detent (26) between the Joint Elements (2, 3).
In order to permit a more accurate and permanent adjustment and to facilitate a space-saving design, the Adjustment Device (5) comprises
a Spreader Device (6) with at least one Spreader Element (7) adjustable along the Pivot Axis (4) and
at least one Force Transfer Surface (16) that interacts with the Spreader Device (6) in order to transfer the spreading force of the Spreader Device (6) into a force acting from the Adjustment Device (5) on at least one Joint Element (2, 3), preferably in direction of the Pivot Axis (4).

26 Claims, 6 Drawing Sheets

(51) Int. Cl.
*G02B 7/12* (2021.01)
*G02B 7/06* (2021.01)
*F16M 11/10* (2006.01)
*G02B 7/02* (2021.01)

(52) U.S. Cl.
CPC ......... *G02B 7/12* (2013.01); *F16M 2200/021* (2013.01)

(58) Field of Classification Search
USPC .................................. 359/399, 415, 410–413
See application file for complete search history.

(56) References Cited

U.S. PATENT DOCUMENTS

| | | | |
|---|---|---|---|
| 4,264,121 A | 4/1981 | Schmidt et al. | |
| 4,264,122 A * | 4/1981 | Schmidt | G02B 23/18 359/412 |
| 4,329,013 A | 5/1982 | Hengst | |
| 4,568,155 A | 2/1986 | Shimizu | |
| 5,973,830 A * | 10/1999 | Ichikawa | G02B 7/12 359/412 |
| 7,330,310 B2 | 2/2008 | Hengst et al. | |
| 2002/0023989 A1 | 2/2002 | Ishikawa et al. | |
| 2010/0188744 A1* | 7/2010 | Hengst | G02B 7/12 359/413 |
| 2015/0070759 A1* | 3/2015 | Yamamoto | G02B 7/12 359/413 |

FOREIGN PATENT DOCUMENTS

| | | |
|---|---|---|
| DE | 2424792 A1 | 12/1975 |
| DE | 2841611 A1 | 4/1979 |
| DE | 2843877 A1 | 4/1980 |
| DE | 148108 A1 | 5/1981 |
| DE | 3150795 A1 | 11/1982 |
| EP | 1598690 A1 | 11/2005 |
| GB | 1427004 A | 3/1976 |
| GB | 2051403 A | 1/1981 |
| GB | 2106586 A | 4/1983 |

* cited by examiner

PIVOT HINGE FOR A LONG-RANGE OPTICAL INSTRUMENT

BACKGROUND OF THE INVENTION

The invention relates to a pivot hinge for a long-rage optical instrument, in particular binocular. The invention also relates to a long-range optical instrument, in particular binocular, having a first tube and a second tube that are connected to each other and pivotable against each other with a pivot hinge.

The prior art knows to adjust the pivoting resistance between two joint elements of a binocular with a clamp that comprises a screw extending through the clamp and two lock nuts. The disadvantage of such a solution is that the clamping force (and therefore also the pivot resistance) can unintentionally change by the act of locking, but also after opening and closing the joint several times. An exact and permanent adjustment of the pivot resistance is therefore not possible with such a clamp. Moreover, such a clamp, in particular due to the lock nuts, requires substantial assembly space.

BRIEF SUMMARY OF THE TECHNOLOGY

The task of the present invention was to overcome the disadvantages of the prior art and to provide a pivot hinge on which the adjustment of the pivot resistance or detent between the joint parts can be accomplished accurately and permanently. In particular, the applied adjustment is to remain unchanged over an extended period even after the joint elements were pivoted against each other several times. The adjustment device is to further be characterized by low space requirements.

This task is solved with the initially mentioned pivot hinge in that the adjustment device

- comprises a spreader device with at least one adjustable spreader element along the pivot axis and
- comprises at least one force transfer surface interacting with the spreader device in order to transfer the spreading force of the spreader device into a force acting from the adjustment device on at least one joint element (preferably on both joint elements), preferably in direction of the pivot axis.

By adjusting the spreader element, the force acting directly or indirectly on the force transfer surface can be adjusted and/or a displacement of the force transfer surface relative to the spreader device can be effected. In both cases, the adjustment device can be arranged such that the spreader device forces the transfer surface in an axial direction. This permits an adjustment of, and/or force to be applied on, the particular part on which the force transfer surface is formed.

The use of a spreader device that acts against the force transfer surface can, with respect to the torque, achieve a decoupling between the joint elements pivotable against each other and the spreader element adjustable along the pivot axis (and/or an adjusting element acting on the spreader element). The adjustment device and/or an adjustment made with the adjustment device cannot be adjusted even when the joint elements are repeatedly pivoted. The required assembly space can also be reduced since the lock nuts are now no longer required.

The at least one force transfer surface is formed to transfer the spreading force of the spreader device into a force (e.g. clamping force or locking force) acting from the adjustment device on at least one joint element, preferably both joint elements. Preferably, this involves generating a force acting from one joint element on the other joint element. This force can act directly or indirectly—e.g. through at least one spacer and/or transfer element or e.g. also through at least one part of the adjustment device itself—from one joint element on the other joint element. In other words: a force acting from one joint element on the other joint elements can be generated by manipulating on and/or adjusting the adjustment device. The force acting from one joint element on the other joint elements in particular is a force that preferably presses or moves the joint elements toward each in the direction of the pivot axis.

The long-range optical instrument preferably is a telescope with at least two tubes. A long-range optical instrument in particular is defined as a device suited for observing an object located at a distance from the long-range optical instrument of at least two meters, preferably of at least 10 meters, and particularly preferably of at least 100 meters. Long-range optical instruments are in particular intended to magnify the visual angle of distant objects.

A preferred embodiment is characterized in that the spreader device has at least one section spreadable, in particular spreadable apart, by the spreader element, said section in the spread state pressing against at least one force transfer surface. Here, the spreader device acts directly on the force transfer surface. It is preferred when the direction of force of the spreader device acting against the force transfer surface has a radial component.

A preferred embodiment is characterized in that the spreader element is arranged within the spreadable section. Depending on the position of the spreader element, the spreadable section is in this case spread more or less toward the outside, in particular radially. The spreader element is preferably positioned in the spreadable section without play.

A preferred embodiment is characterized in that the spreadable section has at least two, preferably at least four spreader fingers arranged about the pivot axis. This permits a uniform spreading force to be applied in relation to the pivot axis.

A preferred embodiment is characterized in that the force transfer surface is arranged radially outside of the spreadable section. The force transfer surface in this case forms a radial limit for the spreadable section. The force transfer surface in this case is arranged and/or oriented such that the particular part on which the force transfer surface is formed is forced in an axial direction by the spreading force.

A preferred embodiment is characterized in that the force transfer surface comprises a slanted or curved surface relative to the pivot axis, preferably a wedge surface and/or a conical surface and/or a spherical surface. By this measure, the force acting from the spreader device on the force transfer surface can be "deflected", in particular into a force acting in axial direction.

A preferred embodiment is characterized in that the force transfer surface is preferably arranged symmetrically about the pivot axis. The force transfer between the force transfer surface and the spreader device can in this case be accomplished independently from the rotational position (about the pivot axis).

A preferred embodiment is characterized in that the force transfer surface is arranged to convert the force applied by the spreader device, in particular by the spreadable section, into a force and/or movement along the pivot axis.

A preferred embodiment is characterized in that the adjustment device comprises a first part and a second part, wherein the spreader device is arranged on the first part and the force transfer surface is arranged on the second part. The first part and the second part interact with the joint parts.

This involves transferring a force acting between the first part and the second part (based on the adjustment of the spreader element) on the joint elements.

A preferred embodiment is characterized in that the first part and the second part are adjustable against each other in direction of the pivot axis and/or in that the first part and the second can be rotated against each about the pivot axis. The axial adjustability permits the transfer of a (clamping) force acting in axial direction on the joint elements, by which e.g. the friction force between the joint elements is adjustable. The relative rotability permits the first part to be connected rotationally fixed with one of the joint elements, and the second part to be connected rotationally fixed with the other joint element. This improves the contact and therefore the force transfer from parts of the adjustment device on the joint elements.

A preferred embodiment is characterized in that the second part has a sleeve-shaped section and in that the spreader device is at least partially inserted into the sleeve-shaped section and in that the force transfer surface is arranged on the inner wall of the sleeve-shaped section. This permits a particularly space-saving design and a particularly defined adjustment of the spreader device.

A preferred embodiment is characterized in that the first part and the second part form the joint axis for the joint elements and extend through the joint elements. The adjustment device assumes a further function, and components can be eliminated as a result.

A preferred embodiment is characterized in that the force transfer surface has a normal spacing to the pivot axis that tapers in axial direction, preferably in the direction from the second part to the first part. By spreading apart the spreadable section, in this embodiment, the two parts of the adjustment device are forced toward each other because the force transfer surface yields to the pressure of the spreadable section.

A preferred embodiment is characterized in that the spreader element interacts through contact surfaces with a locking element, in particular a locking screw, wherein the contact surface of the locking element and/or the contact surface of the spreader element is/are formed convex, preferably spherical. This measure permits establishing a complete torque decoupling between the joint elements and the locking element.

A preferred embodiment is characterized in that the spreader element has a rotationally symmetrical surface to the pivot axis, preferably a spherical or conical surface. In this case, the spreading force remains independent of the relative position between the spreader device and the force transfer surface.

A preferred embodiment is characterized in that the spreader element is a ball.

A preferred embodiment is characterized in that the adjustment device has an actuating section by means of which the spreader element is adjustable along the pivot axis, wherein the actuating section is preferably arranged on a locking element, in particular a locking nut, interacting with the spreader element, or is arranged directly on the spreader element. The actuating section preferably has a shape—in particular a recessed shape—on the face of a locking nut, e.g. a (crossed) slot, a hexagonal shape, hexagonal socket shape, etc. that can be engaged and adjusted with a corresponding screw driver.

A preferred embodiment is characterized in that the actuating section is accessible from outside of the pivot hinge or is arranged behind a removable cover. This allows the user to personally adjust the pivot resistance and/or the detent, who then does not have to depend on (pre-)adjustments made by the factory.

A preferred embodiment is characterized in that the actuating section is arranged in the face of a locking screw and/or in that the actuating section is intersected by the pivot axis.

A preferred embodiment is characterized in that the adjustment device is a clamping or feed device, wherein the joint elements are pressable toward each other or movable toward each other by a force of the clamping or feed device acting on the joint elements in direction of the pivot axis and adjustable by the spreader device. A clamping force allows the friction resistance and therefore the pivot resistance to be adjusted in a targeted manner. The ability to feed the joint elements toward each other also permits the establishment of a detent arranged between the joint elements (establishment of detent engagement) or the adjustment of the latter (adjustment of detent resistance).

A preferred embodiment is characterized in that a first clamping surface that is preferably arranged essentially vertically to the pivot axis is arranged on the first part of the adjustment device, and a second clamping surface that is preferably essentially arranged vertically to the pivot axis is arranged on the second part of the adjustment device, wherein the joint elements are arranged between the first clamping surface and the second clamping surface. Preferably, the first clamping surface is in contact with one the joint elements and the second clamping surface is in contact with the other joint element.

A preferred embodiment is characterized in that the joint elements are loaded in axial direction by at least one spring, preferably a spring washer, wherein preferably the at least one spring is arranged between the first part and the second part of the adjustment device. The spring is designed to reduce the (bearing) play between the joint elements. If the adjustment device is a clamping device that presses the joint elements toward each other (in direction of the pivot axis), the spring can in this case counteract the clamping force of the clamping device.

A preferred embodiment is characterized in that the friction resistance between the joint elements is adjustable by the adjustment device.

A preferred embodiment is characterized in that the pivot hinge has a detent by which the joint elements can be fixed relative to each other in different pivot positions, wherein the detent resistance is adjustable by the adjustment device and/or the detent elements of the detent can be engaged by the adjustment device.

The task is also solved by a long-range optical instrument, in particular a binocular, having a first tube and a second tube that are connected to each other and can be pivoted against each other by a pivot hinge according to the invention.

A preferred embodiment is characterized in that the adjustment device has an actuating section by means of which the spreader travel along the pivot axis is adjustable, and in that the actuating section is accessible from outside the long-range optical instrument or is arranged behind a removable cover. The user can then also make adjustments without complications.

A preferred embodiment is characterized in that the joint elements form a bridge between the first tube and the second tube and in that the long-range optical device has a focus actuating element, wherein the actuating section of the adjustment device and the focus actuating element are arranged on opposite sides of the bridge and are preferably intersected by the pivot axis. This permits a space-saving design and the concentration of actuation options in a common area.

BRIEF DESCRIPTION OF THE DRAWINGS

For a better understanding of the invention, the latter is explained in greater detail based on the following figures.

Each of the following figures show in a greatly simplified, schematic representation.

Let it be noted to start that in the various embodiments, the same parts are labeled with the same reference numbers and/or the same component names, wherein the disclosures contained in the entire specification can be transferred accordingly to the same components with the same reference numbers and/or component names. Moreover, the location references selected in the specification, such as top, bottom, lateral, etc. must be applied to the immediately specified and to the rendered Figure, and said location references must be applied accordingly to the new location when the location is changed.

The exemplary embodiments show possible embodiment versions, wherein it is noted at this point that the invention is not limited to the specifically described embodiment versions of same, but that instead various combinations of the individual embodiments among each other are also possible, and—based on the teachings for technical actions by a related invention—that this variability is based on the skills of the person trained in the art and active in this technical field.

The protected scope is specified by the claims. However, the specification and drawings shall be used for interpreting the claims. Individual attributes or attribute combinations from the shown and described different exemplary embodiments can represent independent inventive solutions. The underlying task for the independent inventive solutions can be found in the specification.

As a matter of form, let it be noted in conclusion that for ease of understanding the design, elements are in certain cases not shown to scale and/or enlarged and/or reduced.

Figure 1:
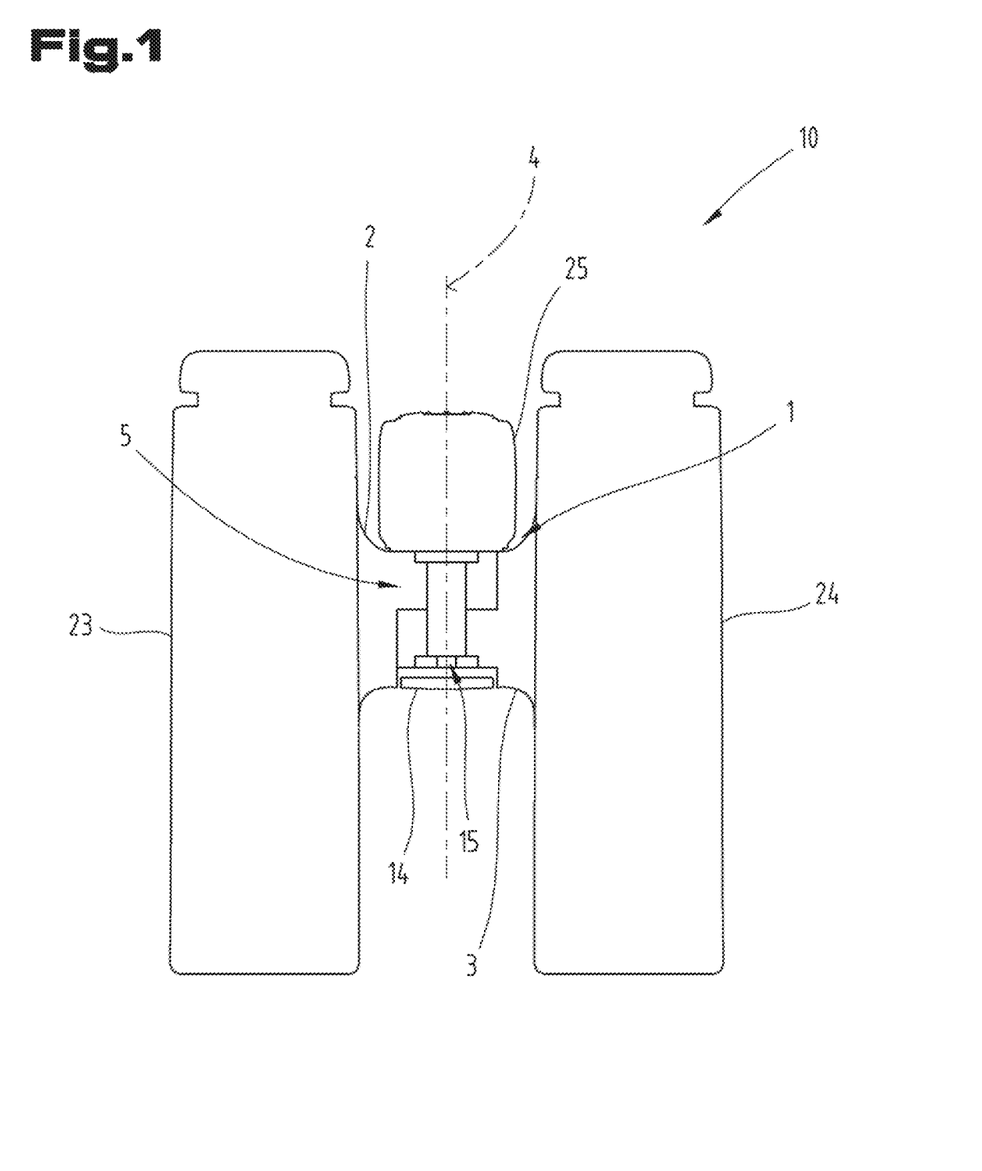
FIG. 1. a long-range optical instrument in the form of a binocular.

FIG. 1 shows as Long-range optical Instrument 10 a telescope in the form of a binocular having a First Tube 23 and a Second Tube 24 that are connected to each other by Pivot hinge 1 and can therefore be pivoted against each other about Pivot Axis 4 of the pivot hinge.

Pivot hinge 1 comprises Joint Elements 2, 3 pivotable against each other about a Pivot Axis 4. One Joint Element 2, 3 is mapped to each Tube 23, 24. The pivot resistance and/or a Detent 26 between Joint Elements 2, 3 is adjustable with an Adjustment Device 5 that interacts with Joint Elements 2, 3.

In an application case, Adjustment Device 5 can be used to e.g. adjust the friction resistance (and therefore the pivot resistance) between Joint Elements 2, 3.

Figure 7:
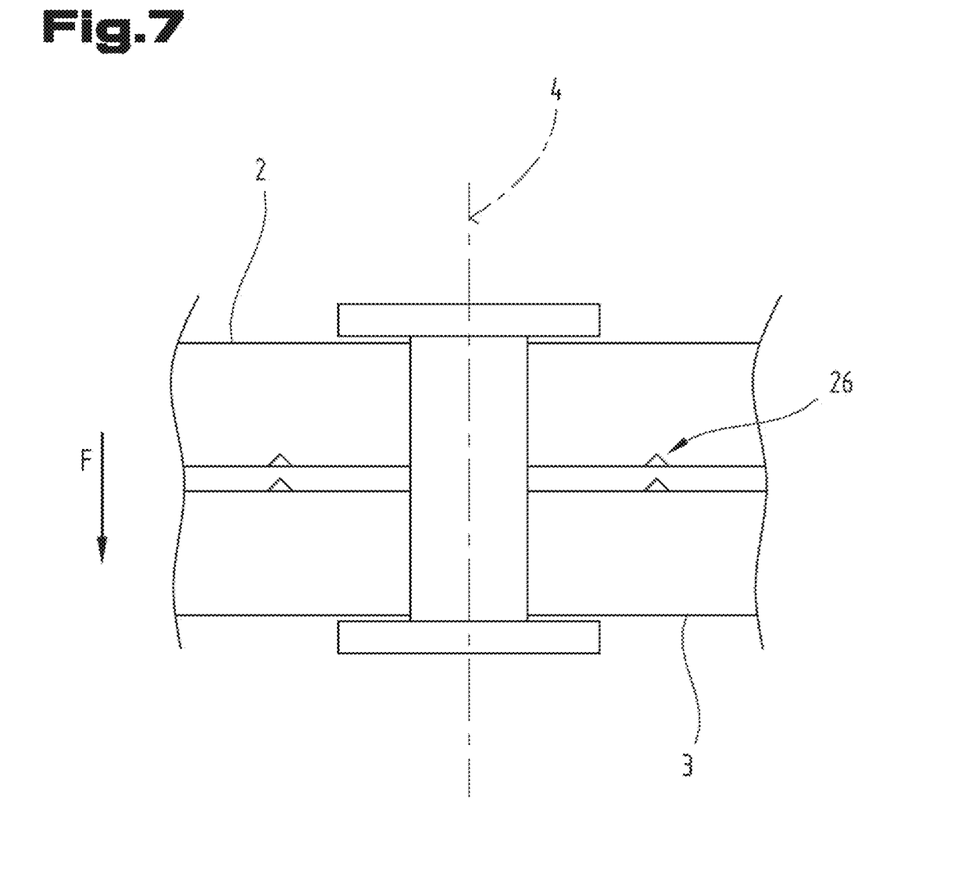
FIG. 7 an embodiment of the pivot hinge with a detent.

In another application case, Pivot hinge 1 has a Detent 26 (FIG. 7) by which Joint Elements 2, 3 are fixed relative to each other in different pivot positions. Adjustment Device 5 can then be used to e.g. adjust the detent resistance and/or to engage or disengage the detent elements of Detent 26.

In the preferred embodiment in FIG. 1, Adjustment Device 5 has an Actuating Section 15 (e.g. a shape—in particular recessed shape—arranged on the face of a lock nut, e.g. a (crossed) slot, a hexagonal shape, hexagonal socket shape, etc.) by means of which a user can make the aforementioned adjustments.

Actuating Section 15 can be accessible from outside Long-range optical Instrument 10 or—as shown in FIG. 1—can be arranged behind a removable (e.g. hinged or completely removable) Cover 14 (e.g. in the form of a cap).

As shown in FIG. 1, Joint Elements 2, 3 form a bridge between the First Tube 23 and the Second Tube 24. The Long-range optical Instrument 10 also has a Focus Actuation Element 25 for focusing the Long-range optical Instrument 10. In the preferred embodiment in FIG. 1, the Actuating Section 15 of Adjustment Device 5 and the Focus Actuation Element 25 are arranged on opposing sides of the bridge and are intersected by Pivot Axis 4.

Figure 2:
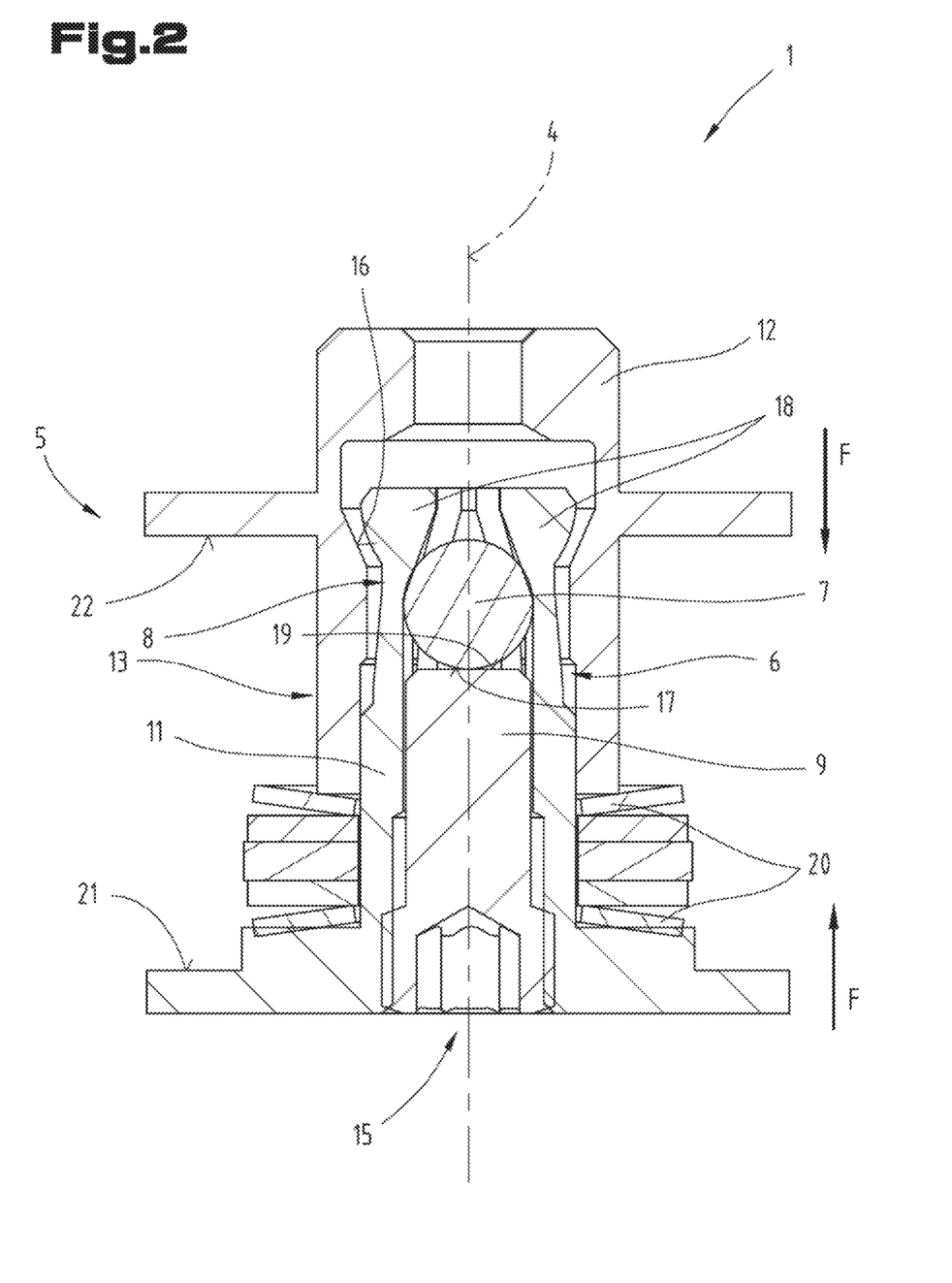
FIG. 2 an embodiment of an adjustment device for adjusting the pivot resistance or a detent between the joint elements.
Figure 3:
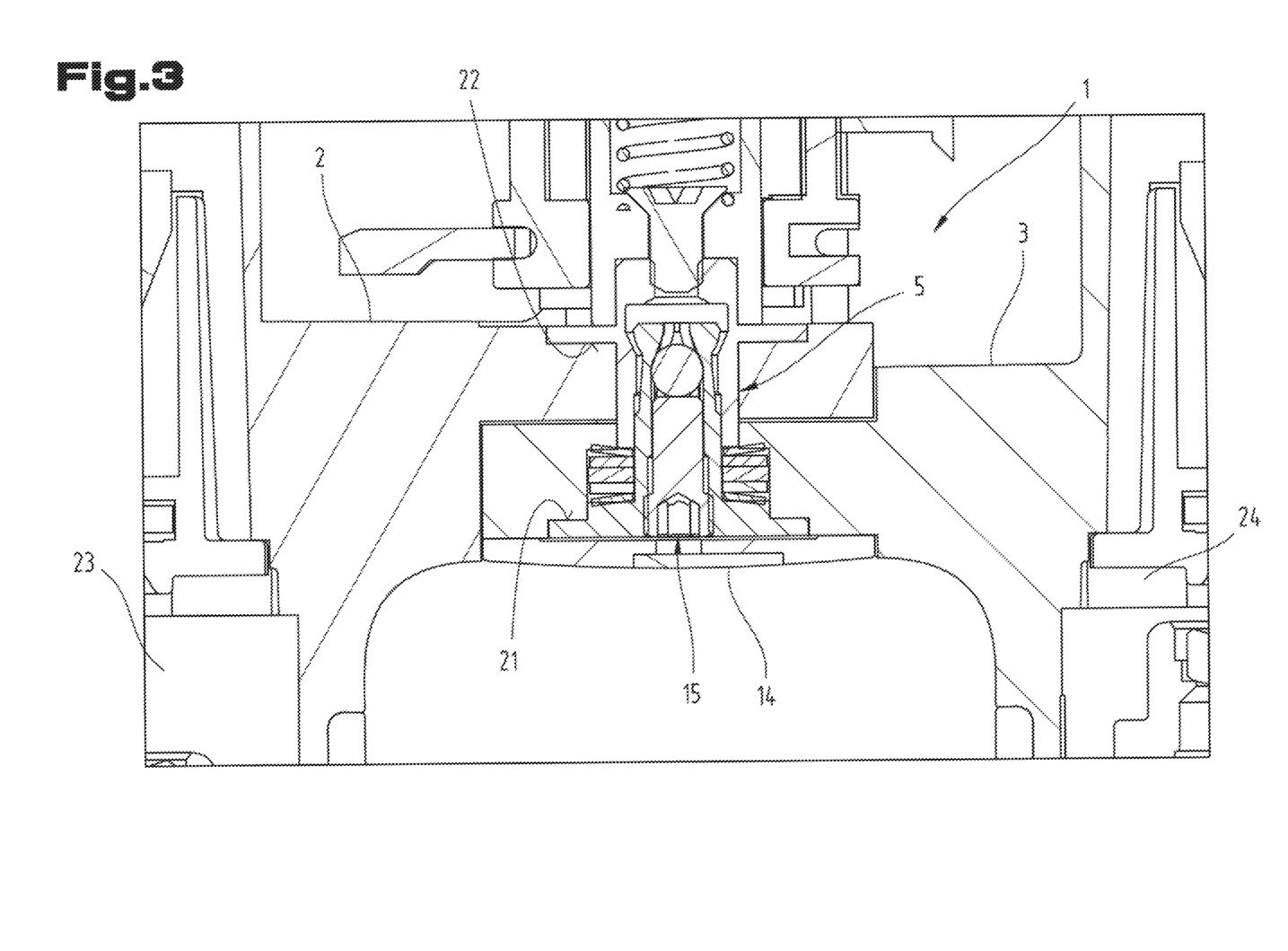
FIG. 3 an embodiment of the a pivot hinge according to the invention.
Figure 4:
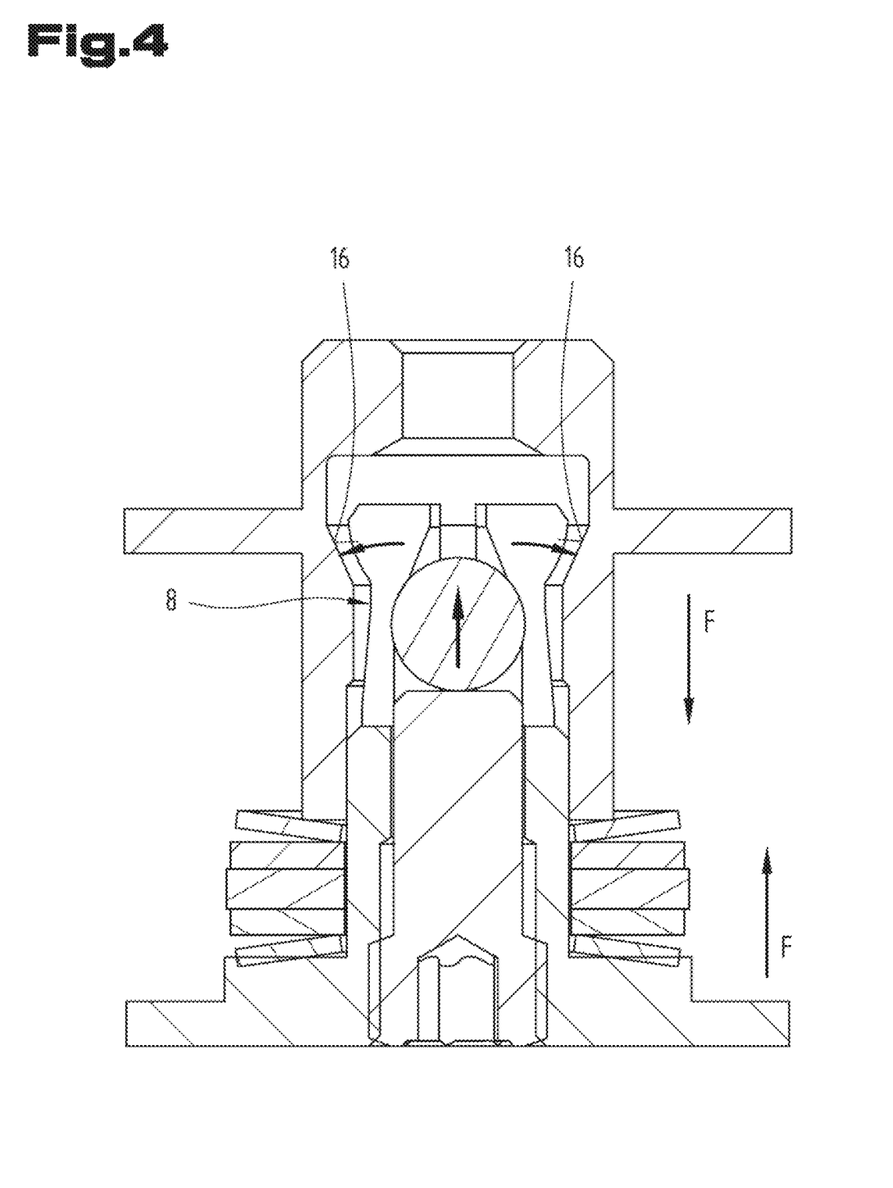
FIG. 4 the transfer of the spreading force into a force acting between the joint elements.
Figure 5:
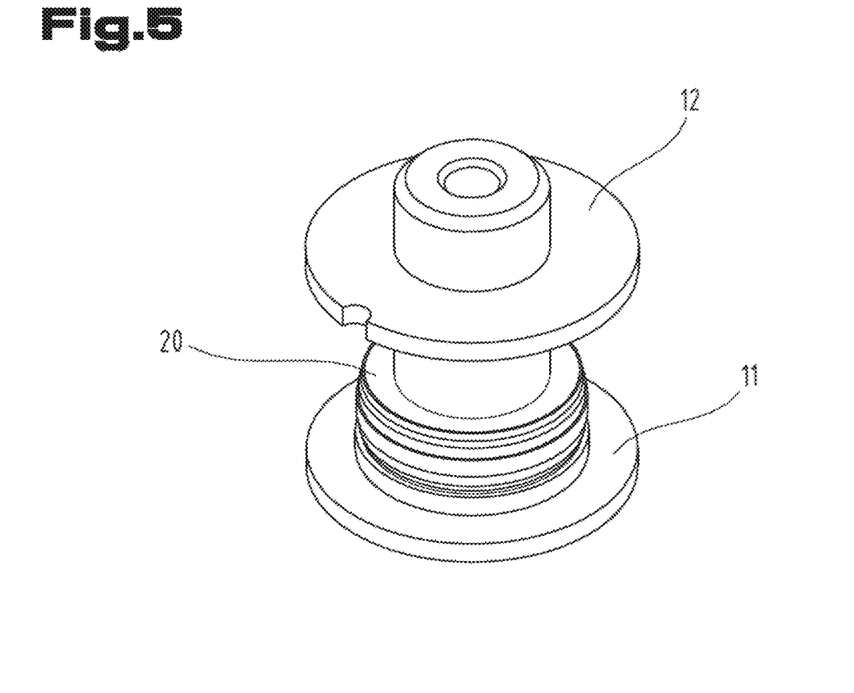
FIG. 5 the adjustment device from FIG. 2 in a perspective view from the outside.
Figure 6:
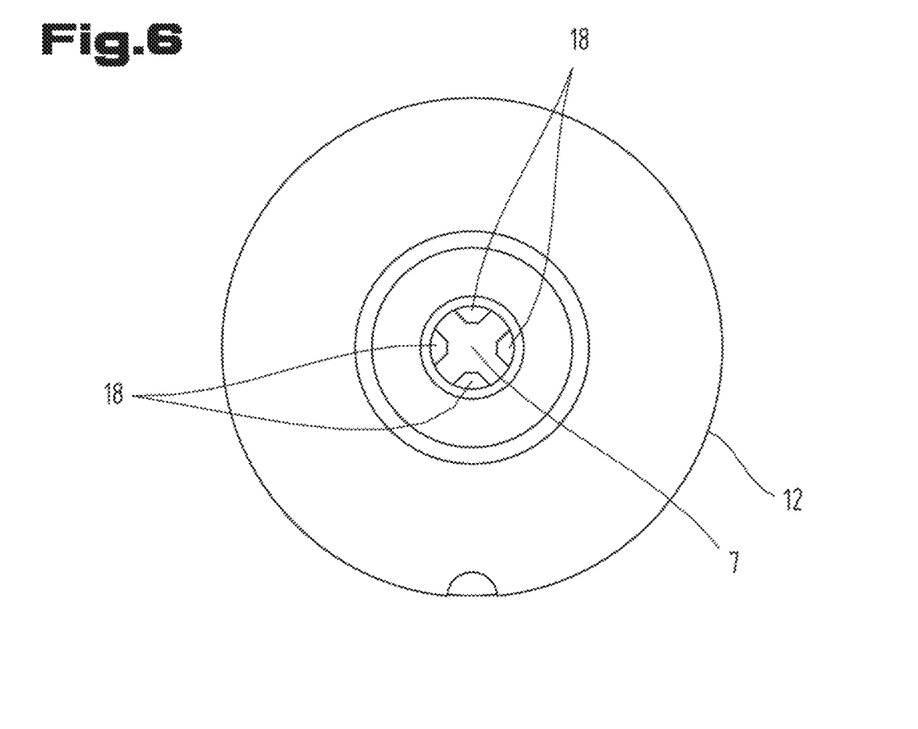
FIG. 6 the adjustment device from FIG. 5 from above.

Adjustment Device 5 is described in detail based on FIG. 2-4. FIGS. 5 and 6 additionally show a perspective view and top view. Adjustment Device 5 comprises a Spreader Device 6 with a Spreader Element 7 adjustable along Pivot Axis 4—here in the form of a ball—and Force Transfer Surface 16 that interacts with Spreader Device 6. In order to transfer the spreading force of Spreader Device 6, Force Transfer Surface 16 is formed as a Force F acting from the adjustment device on at least one of Joint Elements 2, 3, preferably on both Joint Elements 2, 3 (see force transfer flow shown in FIG. 4). In a preferred application case, the spreading force of Spreader Device 6 is transferred into a force acting from a Joint Element 3 on the other Joint Element 2.

Spreader Device 6 has a Section 8 spreadable, in particular spreadable apart, by Spreader Element 7 that presses against the Force Transfer Surface 16 in the spread state. Due to the special form of Force Transfer Surface 16—here with a slanted orientation to Pivot Axis 4—the Force Transfer Surface 16 is "displaced" by the radially spreadable Section 8.

Spreader Element 7 is arranged within the spreadable Section 8 and spreads apart Section 8. In the shown embodiment, the spreadable Section 8 has four Spreader Fingers 18 that are arranged about Pivot Axis 4 (also refer to FIG. 6).

Force Transfer Surface 16 is arranged radially outside of the spreadable Section 8 and comprises a slanted (or alternatively curved) surface relative to Pivot Axis 4, preferably a wedge surface and/or a conical surface and/or a spherical surface. Force Transfer Surface 16 is arranged about Pivot Axis 4 and is formed symmetrically to Pivot Axis 4 in the shown embodiment.

As is shown in particular in FIG. 4, Force Transfer Surface 16 is formed to transfer the force applied by Spreader Device 6, in particular by spreadable Section 8, into a Force F (or force and opposing force) and/or movement along Pivot Axis 4. By moving Spreader Element 7 along Pivot Axis 4, Section 8—in the present case the Spreader Fingers 18—are pressed radially outward and therefore against Force Transfer Surface 16. Due to the special form of Force Transfer Surface 16, the spreading force is "deflected" or converted into a Force F acting along Pivot Axis 4.

As shown in FIG. 2, Adjustment Device 5 comprises a First Part 11 and a Second Part 12. Spreader Device 6 is configured on the First Part 11 and Force Transfer Surface 16 is configured on the Second Part 12.

The First Part 11 and the Second Part 12 are adjustable against each other in direction of Pivot Axis 4 and are preferably also rotatable against each other about Pivot Axis 4.

In the shown embodiment, the Second Part 12 has a sleeve-shaped Section 13. Spreader Device 6 is at least partially inserted into the sleeve-shaped Section 13. The Force Transfer Surface 16 is arranged on an inner wall of the sleeve-shaped Section 13.

As shown in FIG. 3, which shows the entire Pivot hinge 1, the First Part 11 and the Second Part 12 form the joint axis for Joint Elements 2, 3 and extend through Joint Elements 2, 3.

As already indicated above, Force Transfer Surface 16 has a tapered normal spacing to Pivot Axis 4 in axial direction, preferably in direction from the Second Part 12 to the First Part 11.

The following is a detailed description of a preferred operating mode of the spreader element. Spreader Element 7 can interact with a Locking Element 9 (here: a locking screw) via Contact Surfaces 17, 19. Contact Surface 17 of Spreader Element 7 has a convex—here spherical—form. Additionally or alternatively, Contact Surface 19 of Locking Element 9 can also have a convex form.

Spreader Element 7 can have a rotationally symmetrical surface to Pivot Axis 4, preferably a spherical or conical surface. A rotationally symmetrical surface can for example interact with the spreadable Section 8 and/or with Locking Element 9.

As already mentioned, Adjustment Device 5 can have an Actuating Section 15 by means of which Spreader Element 7 is adjustable along Pivot Axis 4. Actuating Section 15 can in this case be arranged on a Locking Element 9, in particular a locking screw (see FIG. 2), that interacts with Spreader Element 7, or alternatively can be configured directly on Spreader Element 7 (not shown).

Actuating Section 15 can be arranged accessible from outside Pivot hinge 1 or can be arranged behind a removable Cover 14.

In the embodiment shown in FIG. 3, Adjustment Device 5 is a clamping device that presses Joint Elements 2, 3 against each other in axial direction. In another application case, shown schematically in FIG. 7, Adjustment Device 5 can be a feed device that moves Joint Elements 2, 3 toward each other in axial direction. Both the clamping force in the first application case and the feed motion in the second application case are effected by force adjustable with Spreader Device 6.

FIGS. 2 and 3 further show:
- a First Clamping Surface 21 arranged on the First Part 11 of Adjustment Device 5 and essentially arranged vertically to Pivot Axis 4 and contacting the first Joint Element 2, and
- a Second Clamping Surface 22 arranged on the First Part 12 of Adjustment Device 5 and essentially arranged vertically to Pivot Axis 4 and contacting the second Joint Element 3.

Joint Elements 2, 3 are therefore arranged or clamped between the First Clamping Surface 21 and the Second Clamping Surface 22. The clamping effect between the two Clamping Surfaces 21, 22 is generated by the opposing Forces F (shown in FIGS. 2 and 4) (force and opposing force).

Additionally, Joint Elements 2, 3 can be loaded in axial direction by at least one Spring 20, preferably a spring washer. As shown in FIG. 2 or 3, the at least one Spring 20 can in this case be arranged or act between the First Part 11 and the Second Part 12 of Adjustment Device 5.

Let it be noted at this point that the invention is not limited to the shown embodiments. The basic principle of a spreader device can be implemented in variety of ways. The spreading force specifically adjustable by the spreader element can be implemented or deflected in a variety of ways. The force acting from the adjustment device to at least one joint element must not necessarily be parallel to the pivot axis. Application cases on which the force acts in radial direction (e.g. vertically to the pivot axis) or in a direction with a radial component are also conceivable. A radially acting spreading force of the spreader device can e.g. act directly or indirectly on a force transfer surface that effect no, or no meaningful, deflection of the force. The joint elements can thereby be spread apart together (also radially), which also generates a force acting between the joint elements.

The force transfer surface can interact directly or indirectly (e.g. by transmission between spacer or transfer elements) with the spreader device.

The force transfer surface could be formed in an embodiment directly on one of the joint elements. The form and orientation of the force transfer surface can vary depending on the application case and the direction of the force flow. Several force transfer surfaces for transferring or deflecting the spreading force can also be specified.

In place of a separate locking element, the spreader element itself could have a locking section (e.g. threaded section) or an actuation section.

REFERENCE NUMBER LIST

1 Pivot hinge
2 Joint Element
3 Joint Element
4 Pivot Axis
5 Adjustment Device
6 Spreader Device
7 Spreader Element
8 Spreadable Section
9 Locking Element
10 Long-range optical Instrument
11 First Part of Adjustment Device 5
12 Second Part of Adjustment Device 5
13 Sleeve-Shaped Section
14 Cover
15 Actuating Section
16 Force Transfer Surface
17 Contact Surface of Spreader Element 7
18 Spreader Fingers
19 Contact Surface of Locking Element 9
20 Spring
21 First Clamping Surface
22 Second Clamping Surface
23 First Tube
24 Second Tube
25 Focus Actuation Element
26 Detent

The invention claimed is:

1. A pivot hinge for a long-range optical instrument, comprising:
   two joint elements pivotable against each other about a pivot axis, and
   an adjustment device for adjusting a pivot resistance and/or a detent between the joint elements,
   wherein the adjustment device comprises:
      a spreader device with at least one spreader element adjustable along the pivot axis, and
      at least one force transfer surface interacting with the spreader device to transfer a spreading force of the spreader device into a force acting from the adjustment device on at least one of the joint elements, wherein the at least one force transfer surface is formed to transfer the force applied by the spreader device into another force and/or motion along the pivot axis.

2. The pivot hinge according to claim 1, wherein the spreader device has at least one spreadable section configured to be spread apart by the at least one spreader element, said at least one spreadable section being further configured to press against the at least one force transfer surface in a spread state.

3. The pivot hinge according to claim 2, wherein the at least one spreader element is arranged within the at least one spreadable section.

4. The pivot hinge according to claim 2, wherein the at least one spreadable section has at least two spreader fingers that are arranged about the pivot axis.

5. The pivot hinge according to claim 2, wherein the at least one force transfer surface is arranged radially outside of the at least one spreadable section.

6. The pivot hinge according to claim 1, wherein the at least one force transfer surface comprises a slanted or curved surface relative to the pivot axis.

7. The pivot hinge according to claim 1, wherein the at least one force transfer surface is arranged about the pivot axis.

8. The pivot hinge according to claim 1, wherein the adjustment device comprises a first part and a second part, wherein the spreader device is formed on the first part and the at least one force transfer surface is formed on the second part.

9. The pivot hinge according to claim 8, wherein the first part and the second part are adjustable against each other in direction of the pivot axis, and/or
   the first part and the second part are rotatable against each other about the pivot axis.

10. The pivot hinge according to claim 8, wherein the second part has a sleeve-shaped section,
    the spreader device is at least partially inserted into the sleeve-shaped section, and
    the at least one force transfer surface is arranged on an inner wall of the sleeve-shaped section.

11. The pivot hinge according to claim 8, wherein the first part and the second part form the pivot axis and the pivot axis extends through the joint elements.

12. The pivot hinge according to claim 8, wherein first clamping surface is arranged on the first part of the adjustment device and in that a second clamping surface is formed on the second part of the adjustment device, and wherein the joint elements are arranged between the first clamping surface and the second clamping surface.

13. The pivot hinge according to claim 1, wherein the at least one force transfer surface has a normal spacing to the pivot axis tapering in an axial direction.

14. The pivot hinge according to claim 1, wherein the at least one spreader element interacts via contact surfaces with a locking element, and
    the contact surface of the at least one spreader element and/or the contact surface of the locking element has a convex form.

15. The pivot hinge according claim 1, wherein the at least one spreader element has a rotationally symmetrical surface to the pivot axis.

16. The pivot hinge according to claim 1, wherein the at least one spreader element is a ball.

17. The pivot hinge according to claim 1, wherein the adjustment device has an actuating section by means of which the at least one spreader element is adjustable along the pivot axis.

18. The pivot hinge according to claim 17, wherein the actuating section is accessible from outside the pivot hinge or is arranged behind a removable cover.

19. The pivot hinge according to claim 17, wherein the actuating section is formed on the face of an adjusting screw and/or in that the actuating section is intersected by the pivot axis.

20. The pivot hinge according to claim 1, wherein the adjustment device is a clamping or feed device, wherein the joint elements can be pressed toward each other or can be moved toward each other by a force acting from the clamping or feed device on the joint elements in direction of the pivot axis, said force adjustable by the spreader device.

21. The pivot hinge according to claim 1, wherein the joint elements are loaded in an axial direction with at least one spring.

22. The pivot hinge according to claim 1, wherein a friction resistance between joint elements is adjustable by the adjustment device.

23. The pivot hinge according to claim 1, wherein the pivot hinge has the detent by means of which the joint elements are fixable relative to each other in different pivot positions, wherein a detent resistance is adjustable, and/or detent elements of the detent can be engaged, by the adjustment device.

24. A long-range optical instrument having a first tube and a second tube that are connected with, and pivotable against, each other through a pivot hinge, wherein the pivot hinge is formed according to claim 1.

25. The long-range optical instrument according to claim 24, wherein the adjustment device has an actuating section by means of which the at least one spreader element is adjustable along the pivot axis and in that the actuating section is accessible from outside the long-range optical instrument or is arranged behind a removable cover.

26. The long-range optical instrument according to claim 24 wherein the joint elements form a bridge between the first tube and the second tube and in that the long-range optical instrument has a focus actuator element, wherein the actuating section of the adjustment device and the focus actuator element are arranged on opposing sides of the bridge and are intersected by the pivot axis.

* * * * *